United States Patent
Satyamurti

Patent Number: 5,806,023
Date of Patent: Sep. 8, 1998

[54] METHOD AND APPARATUS FOR TIME-SCALE MODIFICATION OF A SIGNAL

[75] Inventor: Sunil Satyamurti, Delray Beach, Fla.

[73] Assignee: Motorola, Inc., Schaumburg, Ill.

[21] Appl. No.: 605,827

[22] Filed: Feb. 23, 1996

[51] Int. Cl.$^6$ .................................................. G10L 9/08
[52] U.S. Cl. ............................................ 704/211; 704/218
[58] Field of Search ........................ 395/2.2; 455/67.1, 455/77.1; 704/211, 218

[56] References Cited

U.S. PATENT DOCUMENTS

| | | | |
|---|---|---|---|
| 4,839,923 | 6/1989 | Kotzin | 704/226 |
| 5,068,898 | 11/1991 | Dejmek et al. | 381/24 |
| 5,175,769 | 12/1992 | Hejna, Jr. et al. | 381/34 |
| 5,216,744 | 6/1993 | Alleyne et al. | 704/20 C |
| 5,239,306 | 8/1993 | Siwiak et al. | 340/825.44 |
| 5,282,205 | 1/1994 | Kuznicki | 370/429 |
| 5,473,727 | 12/1995 | Nishiguchi et al. | 395/2.31 |
| 5,524,274 | 6/1996 | Takahashi et al. | 455/34.2 |
| 5,546,411 | 8/1996 | Leitch et al. | 371/5.5 |
| 5,606,729 | 2/1997 | D'Amico et al. | 455/67.1 |
| 5,613,218 | 3/1997 | Li et al. | 455/71 |
| 5,629,935 | 5/1997 | Oh | 370/471 |
| 5,630,013 | 5/1997 | Suzuki et al. | 395/2.25 |
| 5,633,873 | 5/1997 | Kay et al. | 370/336 |

OTHER PUBLICATIONS

Verhelst and Roelands, An Overlap–Add Technique Based On Waveform Similarity (WSOLA) For High Quality Time–Scale Modification of Speech, IEEE 1993, pp. II–554–II–557.

Oppenheim and Schafer, Changing the Sampling Rate Using Discrete–Time Processing, Discrete–Time Signal Processing, 1989, Ch. 3.6, pp. 101–112.

*Primary Examiner*—David R. Hudspeth
*Assistant Examiner*—Michael M. Opsasnick
*Attorney, Agent, or Firm*—R. Louis Breeden

[57] ABSTRACT

A method used by a controller (112) and a communication receiver (122) for performing a time-scale modification of a signal comprised of an input stream of signal representations to form an output stream of signal representations. An output block of $S_o$ signal representations is selected from the output stream for use in overlapping signal representations from the output block with $S_o$ contiguous signal representations of the input stream, the $S_o$ contiguous signal representations beginning with a predetermined signal representation. The overlapping process includes determining (406) a maximum similarity measure between selected portions of the input and the output streams, applying (410) a weighting function to each, and summing the results of each. The overlapping process further includes replacing (412) a selected portion of the output stream with the latter summation, and selecting (414) a new set of samples from the input stream to append to the output stream.

20 Claims, 4 Drawing Sheets

_400_

5,806,023

METHOD AND APPARATUS FOR TIME-SCALE MODIFICATION OF A SIGNAL

RELATED APPLICATIONS

Application Ser. No. 08/395,739 filed Feb. 28, 1995 by Satyamurti et al., entitled "A communication System and Method Using A Speaker Dependent Time-Scaling Technique."

Application Ser. No. 08/395,747 filed Feb. 28, 1995 by Leitch et al., entitled "Voice Compression Method and Apparatus in a Communication System."

FIELD OF THE INVENTION

This invention relates in general to communication systems, and more specifically to a method and apparatus for performing time-scale modification of a signal.

BACKGROUND OF THE INVENTION

Prior art systems employing time-scale modification for compressing a signal have utilized a technique that compares the output synthesized signal to the original input signal to determine a best correlation match. This method of time-scale modification has adequately provided compression ratios of up to five to one.

Although this technique has proven effective, the audio quality of reconstructed signal is not audibly pleasing to a user when high compression ratios are used. Moreover, current techniques employed by time-scale modification devices have undesirably high processing requirements such as, for example, high digital signal processing speeds and extensive memory utilization.

These processing requirements have increased the overall cost of existing time-scale modification equipment and, in particular, have adversely affected the battery life performance of portable communication receivers employing time-scale modification.

Thus, what is needed is a method and apparatus which employs an enhanced time-scale modification technique which is efficient, and significantly improves on the audio quality of the reconstructed signal.

SUMMARY OF THE INVENTION

An aspect of the present invention is a method for time-scale modification of a signal comprised of an input stream of signal representations to form an output stream of signal representations. The method comprises the steps of determining an output block of $S_o$ signal representations from the output stream for use in overlapping signal representations from the output block with $S_o$ contiguous signal representations of the input stream, the $S_o$ contiguous signal representations beginning with a predetermined signal representation, and overlapping the $S_o$ signal representations of the output block with the $S_o$ contiguous signal representations to form the output stream.

A second aspect of the present invention is a controller for performing time-scale modification of a signal comprised of an input stream of signal representations to form an output stream of signal representations. The controller comprises a processing system for directing operation of the controller and for processing the input stream to form the output stream therefrom, an input interface coupled to the processing system for receiving a message comprising the input stream and intended for a communication receiver, and a transmitter interface coupled to the processing system for controlling a transmitter to send the message as the output stream to the communication receiver. The processing system is programmed to make a determination of an output block of $S_o$ signal representations from the output stream for use in overlapping signal representations from the output block with $S_o$ contiguous signal representations of the input stream, the $S_o$ contiguous signal representations beginning with a predetermined signal representation. The processing system is further programmed to perform an overlap of the $S_o$ signal representations of the output block with the $S_o$ contiguous signal representations to form the output stream.

A third aspect of the present invention is a communication receiver for performing time-scale modification of a signal comprised of an input stream of signal representations to form an output stream of signal representations. The communication receiver comprises an antenna for intercepting a radio signal comprising the input stream, a receiver element coupled to the antenna for demodulating the radio signal to derive the input stream, a processing system coupled to the receiver element for processing the input stream to form the output stream, and a user interface coupled to the processing system for conveying the output stream to a user. The processing system is programmed to make a determination of an output block of $S_o$ signal representations from the output stream for use in overlapping signal representations from the output block with $S_o$ contiguous signal representations of the input stream, the $S_o$ contiguous signal representations beginning with a predetermined signal representation. The processing system is further programmed to and perform an overlap of the $S_o$ signal representations of the output block with the $S_o$ contiguous signal representations to form the output stream.

DESCRIPTION OF THE PREFERRED EMBODIMENT

Figure 1:
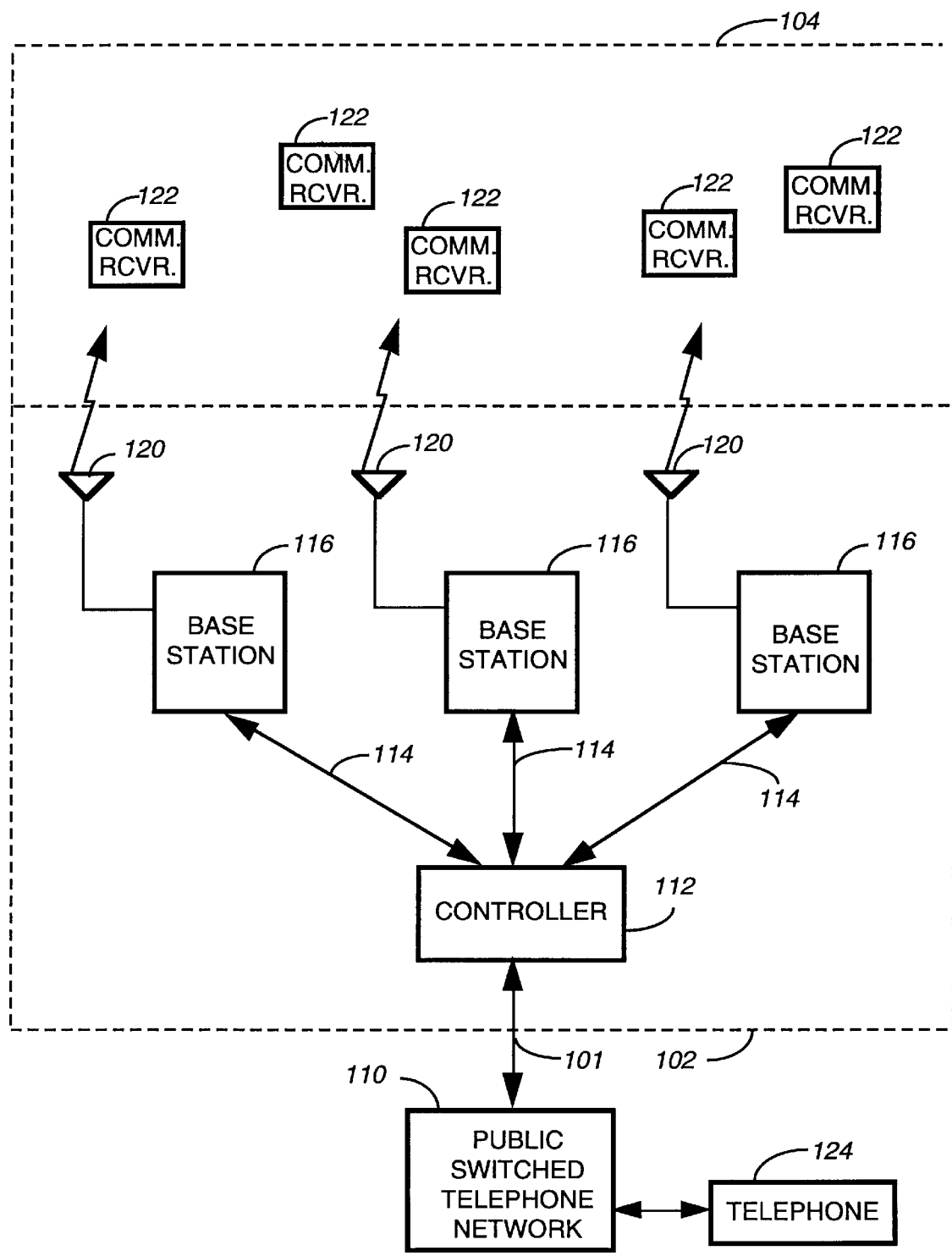
FIG. 1 is an electrical block diagram of a radio communication system in accordance with the preferred embodiment of the present invention.

FIG. 1 is an electrical block diagram of a communication system in accordance with the preferred embodiment of the present invention. The communication system comprises a fixed portion 102 and a portable portion 104. The fixed portion 102 includes a plurality of base stations 116 for communicating with the portable portion 104, utilizing conventional transmission techniques well known in the art, and coupled by communication links 114 to a controller 112 which controls the base stations 116.

The hardware of the controller 112 is preferably a combination of the Wireless Messaging Gateway (WMG™) Administrator! paging terminal and the RF-Conductor!™ message distributor manufactured by Motorola, Inc. The hardware of the base stations 116 is preferably a Nucleus® Orchestra! transmitter manufactured by Motorola, Inc. It will be appreciated that other similar hardware can be utilized for the controller 112 and base stations 116.

Each of the base stations 116 transmits radio signals to the portable portion 104 comprising a plurality of communication receivers 122 via a transmitting antenna 120. The radio signals comprise selective call addresses and message transactions between the base stations 116 and the communication receivers 122. The controller 112 preferably is coupled by conventional telephone links 101 to a public switched telephone network (PSTN) 110 for receiving selective call messages therefrom. The selective call messages comprise voice and data messages received from the PSTN 110 using, for example, a conventional telephone 124 coupled to the PSTN 110 in a manner well known in the art.

Voice, data and control transmissions between the base stations 116 and the communication receivers 122 preferably utilize an outbound protocol such as Motorola, Inc.'s well-known InFLEXion™ digital selective call signaling protocol. It will be appreciated that other communication protocols that operate in a synchronous communication system and that are suitable to this invention can be used.

U.S. patent application Ser. No. 08/395,739 filed Feb. 28, 1995 by Satyamurti et al., entitled "A communication System and Method Using A Speaker Dependent Time-Scaling Technique," and U.S. patent application Ser. No. 08/395,747 filed Feb. 28, 1995 by Leitch et al., entitled "Voice Compression Method and Apparatus in a Communication System" describe a communication system similar to the communication system of FIG. 1. U.S. patent application Ser. Nos. 08/395,739 and 08/395,747 are hereby incorporated herein by reference.

Figure 2:
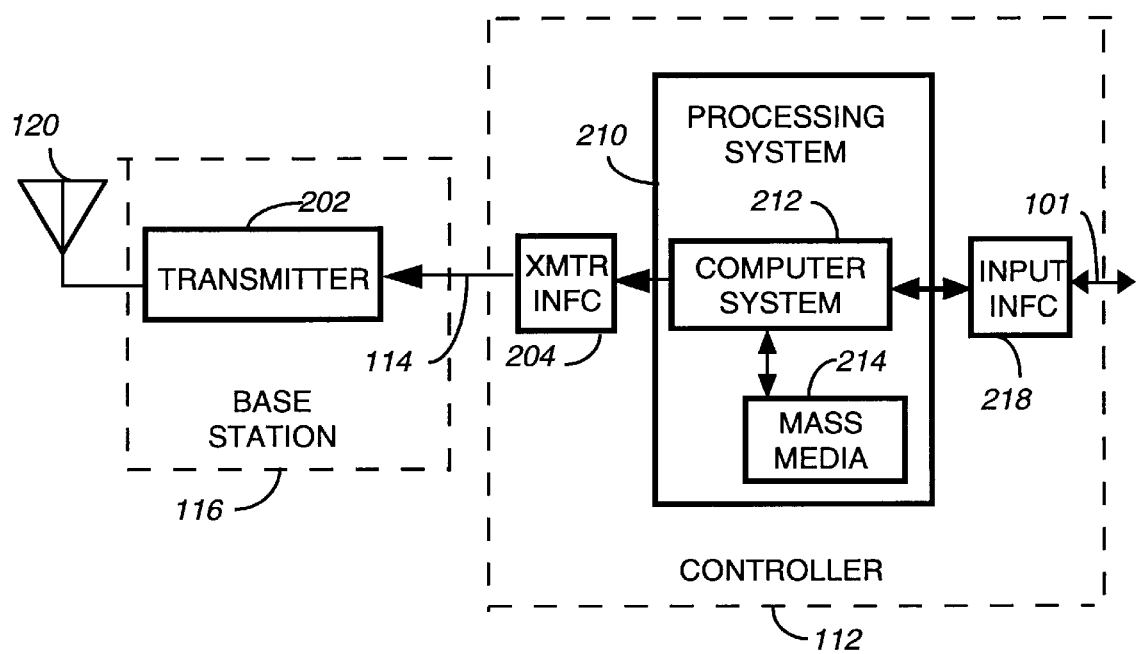
FIG. 2 is an electrical block diagram of elements of the fixed portion of the radio communication system in accordance with the preferred embodiment of the present invention.

FIG. 2 is an electrical block diagram of elements of the fixed portion 102 of the radio communication system in accordance with the preferred embodiment of the present invention. The fixed portion 102 includes the controller 112 and the plurality of base stations 116.

The processing system 210 directs the operation of the controller 112. The processing system 210 preferably is coupled through a transmitter interface 204 for controlling a transmitter 202 of the base station 116. The processing system 210 is also coupled to an input interface 218 for communicating with the PSTN 110 through the telephone links 101 for receiving selective call messages originated by a caller. In order to perform the functions necessary in controlling the elements of the controller 112, as well as the elements of the base stations 116, the processing system 210 preferably includes a conventional computer system 212, and a conventional mass storage medium 214. The mass storage medium 214 includes subscriber user information such as, for example, addressing and programming options of the communication receivers 122.

The computer system 212 is programmed by way of software included in the mass storage medium 214. The computer system 212 preferably comprises a plurality of processors such as, for example, VME Sparc™ processors manufactured by Sun Microsystems, Inc. These processors include memory such as dynamic random access memory (DRAM), which serves as a temporary memory storage device for scratch pad processing such as, for example, storing messages originated by callers, and protocol processing of messages destined for the communication receivers 122. The mass storage medium 214 is preferably a conventional hard disk mass storage device.

It will be appreciated that other types of computer systems 212 can be utilized, and that additional computer systems 212 and mass storage media 214 of the same or alternative type can be added as required to handle the processing requirements of the processing system 210.

The base stations 116 include a conventional transmitter 202 for transmitting radio frequency (RF) signals to the communication receivers 122. For transmitting voice messages, the transmitter 202 preferably utilizes conventional single side-band modulation. For data messages, the transmitter 202 preferably utilizes frequency shift-keyed (FSK) frequency modulation. It will be appreciated that, alternatively, other modulation schemes that are suitable to this invention can also be used.

Figure 3:
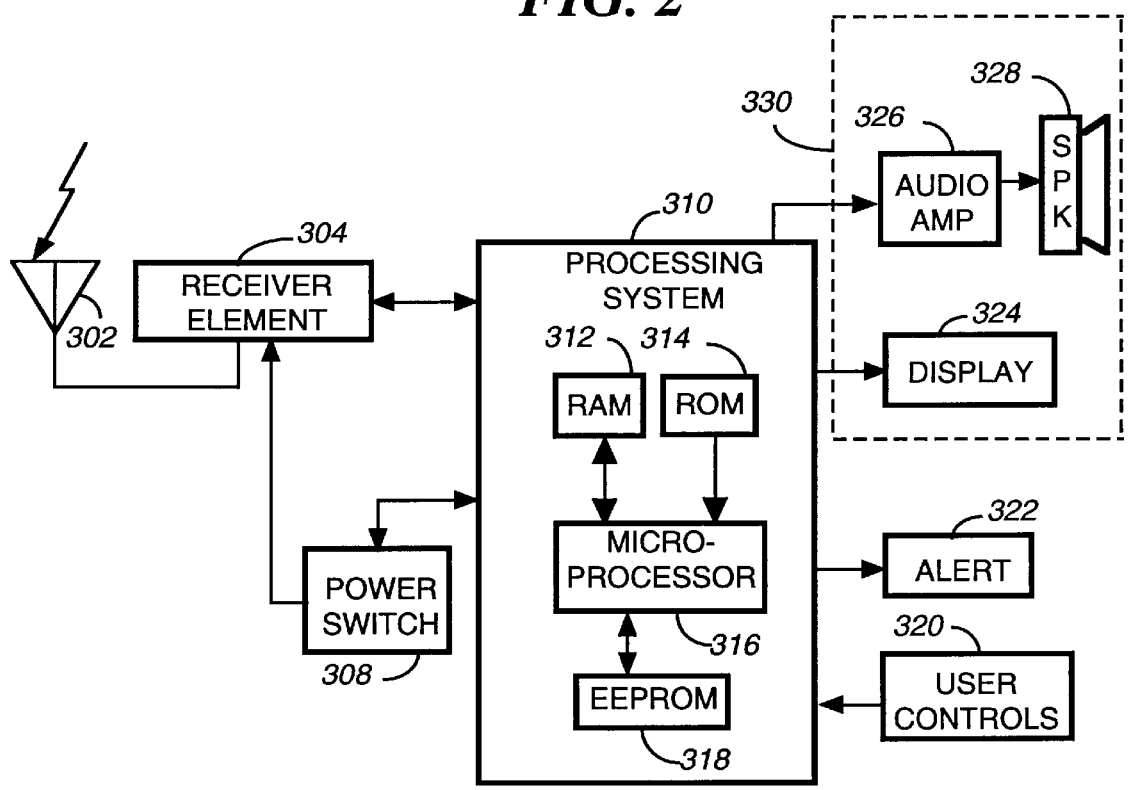
FIG. 3 is an electrical block diagram of a communication receiver utilized in the radio communication system of FIG. 1.

FIG. 3 is an electrical block diagram of the communication receiver 122 in accordance with the preferred embodiment of the present invention. The communication receiver 122 comprises an antenna 302 for intercepting RF signals from the base stations 116. The antenna 302 is coupled to a receiver element 304 employing conventional demodulation techniques for receiving the communication signals transmitted by the base station 116. Radio signals received by the receiver element 304 produce demodulated information, which is coupled to a processing system 310 for processing received messages.

A conventional power switch 308, coupled to the processing system 310, is used to control the supply of power to the receiver element 304, thereby providing a battery saving function.

To perform the necessary functions of the communication receiver 122, the processing system 310 includes a microprocessor 316, a random access memory (RAM) 312, a read-only memory (ROM) 314, and an electrically erasable programmable read-only memory (EEPROM) 318. Preferably, the processing system 310 is similar to the M68HC08 microcontroller manufactured by Motorola, Inc.

It will be appreciated that other similar processors can be utilized for the processing system 310, and that additional processors of the same or alternative type can be added as required to handle the processing requirements of the processing system 310. It will be also appreciated that other types of memory, e.g., EEPROM or FLASH, can be utilized for the ROM 314, as well as the RAM 312. It will be further appreciated that the RAM 312 and the ROM 314, singly or in combination, can be manufactured as an integral portion of the microprocessor 316.

The processing system 310 is programmed by way of the ROM 314 to process incoming messages. The processing system 310 decodes an address in the demodulated data of the received message, compares the decoded address with one or more addresses stored in the EEPROM 318, and when a match is detected, the processing system 310 proceeds to process the remaining portion of the message. Data messages are decoded in a conventional manner. The decoding of voice messages requires the application of an expansion time-scaling process in accordance with the present invention, as will be described below.

Once the processing system 310 has processed the message, it stores the message in the RAM 312, and a call alerting signal is generated to alert a user that a message has been received. The call alerting signal is directed to a conventional audible or tactile alerting device 322 for generating an audible or tactile call alerting signal.

The message can be accessed by the user through user controls 320, which provide functions such as lock, unlock, delete, read, etc. More specifically, by the use of appropriate functions provided by the user controls 320, the message is recovered from the RAM 312, and conveyed to the user by way of a user interface 330. The user interface 330 preferably includes a display 324, and an audio amplifier 326 and speaker 328 combination. The display 324, e.g., a conventional liquid crystal display (LCD), is preferably used for displaying data messages. The audio amplifier 326 and speaker 328 are used for reproducing audio voice messages.

Figure 4:
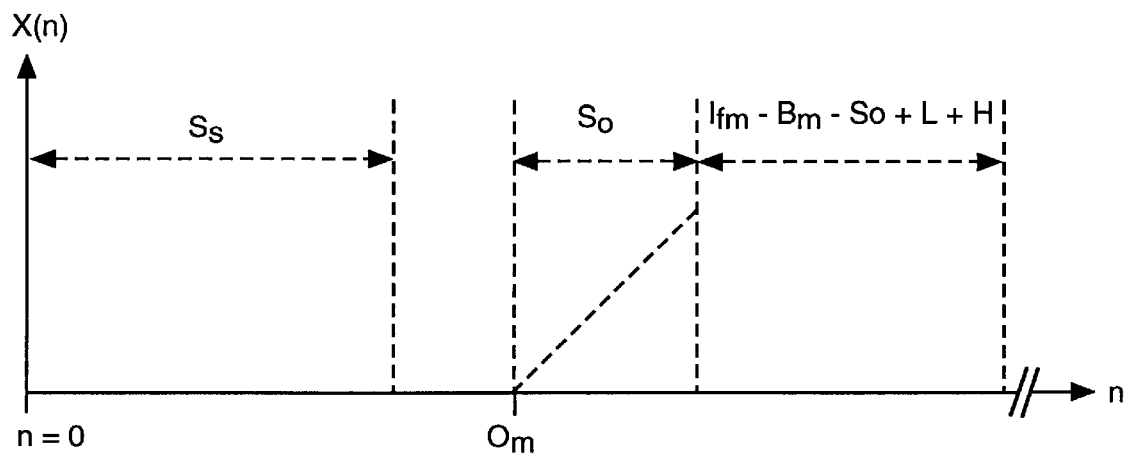
FIGS. 4 and 5 are timing diagrams depicting a time-scaled compression/expansion process utilized by the controller and the communication receiver for transmitting and receiving voice messages in accordance with the preferred embodiment of the present invention.
Figure 5:
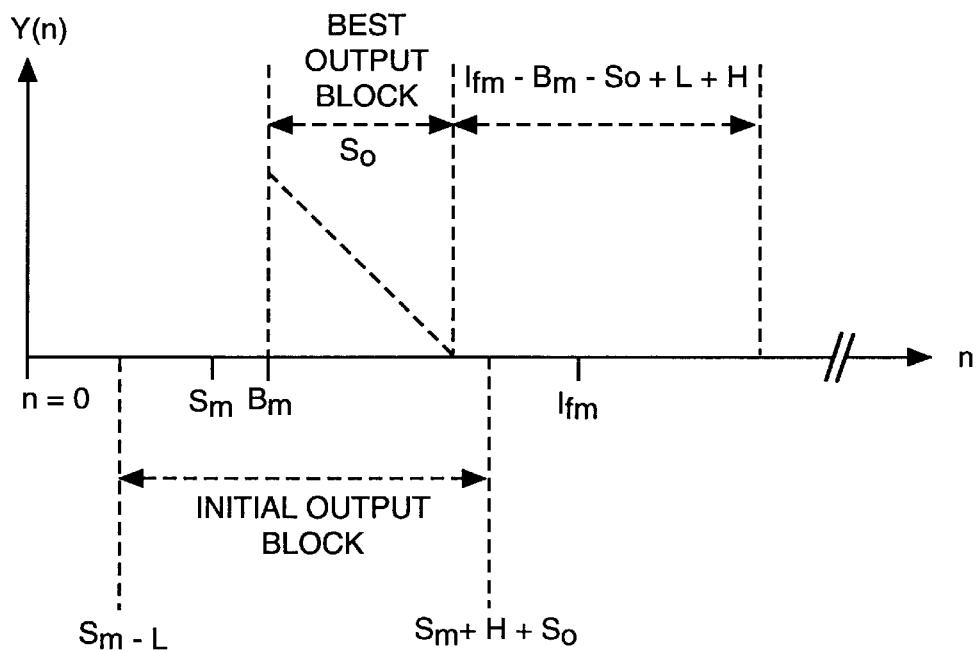

FIGS. 4 and 5 are timing diagrams depicting a time-scaled compression/expansion process utilized by the controller 112 and the communication receivers 122 for transmitting and receiving voice messages in accordance with the preferred embodiment of the present invention. In the controller 112, the processing system 210 utilizes this process for compressing voice messages in a way that minimizes the transmission bandwidth used by the radio communication system, thereby improving the overall efficiency of delivering voice messages to the communication receivers 122.

When the controller 112 receives a voice message from a caller by way of the input interface 218, the processing system 210 digitally samples the amplitude of the message in a conventional manner (e.g., by using an analog-to-digital converter—ADC), thereby generating a digital input stream of signal representations (samples) conforming to a function X(n). FIG. 4 depicts X(n) and the partitioning of samples for creating a compressed output stream of signal representations (samples) conforming to a function Y(n) shown in FIG. 5.

The time-scaled compression/expansion process begins with the partitioning of input stream samples into a sample size $S_s$. The sample size $S_s$ preferably is equal to twice the pitch period P of X(n) samples, i.e., $S_s=2\times P$. As is well-known by one of ordinary skill in the art, the pitch period is equal to the sampling frequency $f_s$ of the ADC used by the processing system 210 divided by the fundamental frequency $f_o$ of the caller's voice, i.e., $P=f_s/f_o$.

An overlap index $O_m$ is used for selecting samples after $O_m$ for generating an output block of the output stream Y(n). The overlap index $O_m$ is calculated by the processing system 210 by multiplying a time-scaling factor $\alpha$ with a search index $S_m$, i.e., $O_m=\alpha\times S_m$. The position of $O_m$ for one calculation cycle is shown in FIG. 4. The search index $S_m$ is initially equal to the pitch period P, or equivalently to $0.5S_s$. The position of the search index $S_m$ is shown in FIG. 5. Its position on the output stream Y(n) is used for locating a best correlation match between samples of the input stream X(n) and samples of the output stream Y(n), as will be described below.

The time-scaling factor $\alpha$ is preferably set to a real number between 0 and 5, depending upon the degree of compression or expansion desired. A value of $\alpha$ greater than 1 results in compression, while a value of $\alpha$ less than 1 results in expansion. The number of samples selected after $O_m$ denotes an overlap segment size $S_o$. The overlap segment size $S_o$ is calculated by the processing system 210 by multiplying a degree of overlap f by the segment size $S_s$, i.e., $S_o=f\times S_s$. The overlap degree f is a predetermined number less than one (e.g., 0.8).

A value of $\alpha=1$ results in an unchanged output voice message that is substantially the same as the original voice message. For values where $\alpha>1$ (i.e., compression) the time scale of the output signal Y(n) is shorter than that of the original voice signal X(n). Since this process is based on the processing of voice signals in the time domain, the effect of compressing the original voice signal X(n) into Y(n) results in an acceleration of the original speech. For example, an original voice message that has a duration of 30 seconds, is compressed in time to 10 seconds for a time-scaling factor of $\alpha=3$.

At the onset of the compression process, the processing system 210 copies $1.5\times S_s$ samples of the original voice message starting at X(n=0) into Y(n=0). Selecting this initial sample size will be made more apparent in a summary of equations provided below. The end of these samples is marked by a final index denoted as $I_{fm}$ (the position of which is shown in FIG. 5). It will be appreciated that, alternatively, larger or smaller sizes of samples of the original voice message can be used.

To determine the position of a best output block, the processing system 210 copies $S_o$ samples after $O_m$ into an input buffer in the memory of the processing system 210 denoted as IN_BUF. The processing system 210 then selects samples from Y(n), delimited by an initial output block shown in FIG. 5, and copies the samples into an output buffer in the memory of the processing system 210 denoted as OUT_BUF.

The size of the initial output block is governed by the formula $S_o+W$, where W is equal to a predetermined search window size. In turn, the search window size is governed by the formula L+H, where L is a low offset factor equal to Low_Search_Weight$\times S_s$, and H is a high offset factor equal to High_Search_Weight$\times S_s$. The high and low search weights are equal to, for example, 0.25, thus resulting in a search window size of $0.5S_s$, and an initial output block size of $S_o+0.5S_s$. The start position of the initial output block is controlled by the formula $S_m-L$, while the end position of the initial output block is controlled by the formula $S_m+H+S_o$. The position of the initial output block and its delimiters is shown in FIG. 5.

Once the initial output block size and its position have been determined by the processing system 210, the processing system 210 then performs a cross-correlation between the samples of IN_BUF and the samples in OUT_BUF in order to determine which contiguous $S_o$ samples in the initial output block best match the contiguous $S_o$ samples of IN_BUF. In performing the similarity measurement, the processing system 210 applies the cross-correlation formula:

$$C(k) = \frac{\sum_{j=1}^{j=So} \text{OUT\_BUF}(j+k) \times \text{IN\_BUF}(j)}{\sum_{j=1}^{j=So} \text{IN\_BUF}^2(j) \sum_{j=1}^{j=So} \text{OUT\_BUF}^2(j+k)},$$

where $k=S_m-L, \ldots, S_m+H$. It will be appreciated that, alternatively, other well-known correlation algorithms can be utilized.

The cross-correlation calculation takes place one sample shifted at a time within the fixed range of samples of the initial output block. This step is repeated in the determination of a similarity measure over the fixed search range of samples of the initial output block. The best correlation value C(k) determines the location of a best index factor denoted as $B_m$. The best index factor $B_m$ is positioned (as shown in FIG. 5) at the first sample where the $S_o$ samples of the input block generate the highest correlation value within the fixed range of samples in the initial output block. The samples located between $B_m$ and $B_m+S_o$ is the position of the output block as shown in FIG. 5.

The processing system 210 is then programmed to apply a weighting function to the input stream samples between $O_m$ and $O_m+S_o$, and a mirror image weighting function to the output stream samples between $B_m$ and $B_m+S_o$. In this example, the weighting function applied to the input stream is a linear fading function with a positive slope, while the weighting function applied to the output stream is a linear fading function with a negative slope as shown in FIGS. 4 and 5, respectively. It will be appreciated that, alternatively, the weighting function applied can be a conventional averaging function, or some other type of weighting function, e.g., a Hamming window or a Hanning window.

Once the weighting functions have been applied, the processing system 210 is then programmed to add the results of the weighted input stream samples to the weighted output stream samples. The resulting final summation of $S_o$ samples represents a maximum similarity of $S_o$ samples between the selected samples of the input stream X(n) and the selected correlation samples of the output stream Y(n). The processing system 210 is then programmed to replace the $S_o$ samples starting at $B_m$ with the $S_o$ samples of the final summation. This completes the first compression cycle performed by the processing system 210.

On the next cycle of compressing the input stream X(n), the processing system 210 places after the output block the continuing signal representations from the input stream starting from the first sample after $O_m+S_o$. The processing system 210 copies $I_{fm}-B_m-S_o+L+H$ samples from the input stream X(n) starting at the first sample after $O_m+S_o$ into the output stream Y(n) starting at the first sample after $B_m+S_o$, thereby substituting previous samples copied from X(n) on the first cycle, and adding a net addition of L+H samples after $I_{fm}$.

Once again the processing system 210 repeats the process of calculating the next search index, the next overlap index, and the next final index. These markers are summarized by the more general equations:

$$S_m = S_{m-1} + 0.5 \times S_s,$$

$$O_m = \alpha \times S_m$$

$$I_{fm} = I_{fm-1}L + H,$$

where m=1,2,3, . . . , M, M being the total number of compression cycles, and where for m=1, $S_1=0.5 \times S_s$, $O_1=\alpha \times 0.5 \times S_s$, and $I_{f1}=1.5 \times S_s$. In addition, the beginning of each initial output block can be determined from the formula $$m \times \frac{0.5 \times S_o}{f} - L,$$

where L is the low offset factor described above. Applying these formulas cyclically along with the correlation formula C(k), and the substitution process described above results in a time-scaled output stream Y(n) that is substantially 1α times the original voice signal X(n) in length.

Because the number of samples in the original voice signal X(n) may not be exactly divisible by the factors described above, it is more than likely that at the end of the input stream the above calculations cannot be readily applied. In this case, the processing system 210 is programmed to copy the incompressible portion of the input stream X(n) directly to the output stream Y(n) without application of the compression process.

This anomaly in the compression process has negligible effects on the signal quality of the output signal stream Y(n). This is because the compression process factors discussed above are set to predetermined values that amount to the processing of small partitions of the original signal stream X(n) (e.g., 20 ms partitions). A small uncompressed partition at the end of the output stream Y(n) has a negligible effect on the compressed speech. Thus, when the compressed voice signal is expanded to its original form, a user will unlikely be able to discern any perturbation at the end of the speech signal.

Once the compressed voice message Y(n) has been calculated, the processing system 210 preferably is programmed to convert the compressed digitized signal Y(n) to a continuous time signal Y(t) using conventional means (e.g., a digital-to-analog converter and associated circuitry—not shown in FIG. 2). The continuous time signal Y(t) is modulated by the transmitter 202 on a single sideband carrier signal which is intended for the communication receiver 122.

Because the time-scaling process described above is symmetrical in nature, the communication receiver 122 can utilize the same process to expand (i.e., restore) the compressed voice message Y(n) to substantially its original form, i.e., X(n). To do this the time-scaling factor α must be less than one, and is preferably substantially equal to the reciprocal of the time-scaling factor α chosen for compression by the controller 112. The details of the calculation process are the same as described above for the controller 112.

Figure 6:
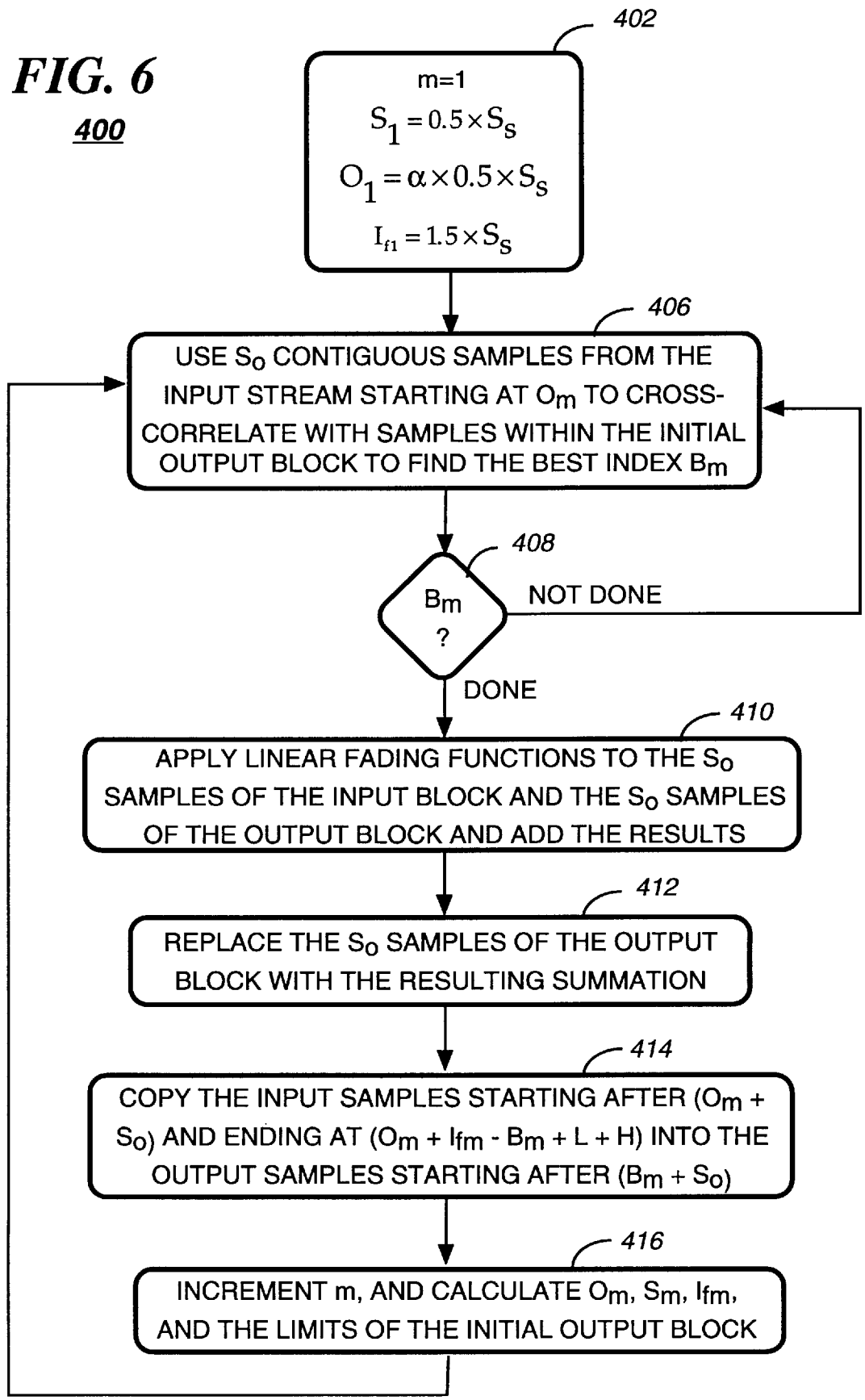
FIG. 6 is a flow chart summarizing the operations utilized by the controller and the communication receiver in accordance with the preferred embodiment of the present invention.

FIG. 6 is a flow chart 400 summarizing the operations utilized by the controller 112 and the communication receiver 122 in accordance with the preferred embodiment of the present invention. The flow chart 400 begins with step 402 where the variables m, $S_m$, $O_m$, and $I_{fm}$ are initialized as described above. In step 406 $S_o$ contiguous samples from the input stream X(n) starting at $O_m$ are cross-correlated with samples within the initial output block in order to find the best index, $B_m$.

The cross-correlation process continues in step 408 until all samples of the initial output block have been tested. Once the highest correlation factor has been determined, i.e., the best index position is known, the output block position is also known. In step 410, mirror images of weighted linear fading functions are applied to both the $S_o$ samples of the input block and the $S_o$ samples of the output block and the results are added together to produce a summation result. In step 412 the summation result replaces the $S_o$ samples of the output block. In step 414 the continuing input samples starting after $O_m+S_o$ and ending at $O_m+I_{fm}-B_m+L+H$ are copied to the output samples starting after $B_m+S_o$. In step 416, m is incremented, and the variables $O_m$, $S_m$, and $I_{fm}$ are calculated along with the limits of the next initial output block as described herein above. Then the process continues cyclically from step 406 until the end of the input stream is reached.

The flow chart 400 applies to the controller 112 when the original voice message X(n) is being compressed by the processing system 210 by a time-scaling factor α. Similarly, flow chart 400 applies to the communication receiver 122 when the compressed voice message Y(n) received from the base station 116 is being expanded by the processing system 310 by an expansion time-scaling factor α which is substantially equal to the inverse of the compression time-scaling factor α.

The time-scaling process described above utilizes an event based approach to time-scale modification of speech by using a predetermined selection of the input speech samples rather than a predetermined selection of the output speech samples as a correlation target. This feature is a major difference between the present invention and prior art systems. The effect of using a predetermined selection of the input speech rather than a predetermined selection of the output speech as the correlation target is to produce time-scaled speech which has higher audio quality after the communication receiver 122 has reconstructed the compressed voice signal. The process is also much simpler than prior art systems, because the search window used for the correlation is substantially smaller. This improvement reduces processing requirements of the communication receiver 122 such as, for example, memory and signal processing speed, thereby reducing the overall cost and complexity of the communication receiver 122.

While the preceding discussion has been directed to time-scaling of speech, it will be appreciated by one of ordinary skill in the art that the present invention is also applicable to other quasi-periodic signals, e.g., music. In addition, the present invention is applicable not only to radio communication systems, but also to other types of apparatus. One example is a dictation machine, in which the present invention can be used for slowing the playback of recorded speech without changing its pitch. Another example is a reading machine for the sight impaired, in which the present invention can be applied for speeding the playback of the reading machine without changing the pitch of the playback. These and other applications of the present invention will be apparent to one of ordinary skill in the art and are considered to be within the scope and intent of the claimed invention.

Thus, it should now be apparent that the present invention provides a novel method and apparatus for time-scaled modification of a signal. The present invention is efficient and significantly improves the audio quality of the time-scaled signal.

What is claimed is:

1. A method for time-scale modification of a signal comprised of an input stream of signal representations to form an output stream of signal representations, the method comprising the steps of:

digitally sampling a signal to generate the input stream of signal representations;

determining an output block of $S_o$ signal representations from the output stream for use in overlapping signal representations from the output block with $S_o$ contiguous signal representations of the input stream, the $S_o$ contiguous signal representations beginning with a predetermined signal representation; and overlapping the $S_o$ signal representations of the output block with the $S_o$ contiguous signal representations to form the output stream.

2. The method of claim 1, wherein $S_o$ is determined by a pitch period and a degree of overlap f.

3. The method of claim 1, wherein the step of overlapping comprises the steps of:

applying a weighting function to the $S_o$ signal representations of the output block and to the $S_o$ contiguous signal representations of the input stream to determine values of $S_o$ signal representations to be substituted for the $S_o$ signal representations of the output block; and placing, immediately after the output block, a predetermined number of continuing signal representations from the input stream, the continuing signal representations being subsequent to the $S_o$ contiguous signal representations of the input stream.

4. The method of claim 3, wherein the weighting function is an average.

5. The method of claim 3, wherein the weighting function provides a linear fade.

6. The method of claim 1, wherein the step of determining the output block comprises the steps of:

determining an initial output block of $S_o+W$ signal representations from the output stream, where W is a predetermined search window size;

determining a maximum of a similarity measure between $S_o$ signal representations of the initial output block and the $S_o$ contiguous signal representations of the input stream over a fixed search range of W signal representations, the fixed search range starting at a first signal representation of the initial output block; and determining the output block to comprise $S_o$ signal representations which begin at a signal representation in the initial output block whose $S_o$ signal representations provided the maximum of the similarity measure.

7. The method of claim 6, wherein the step of determining the initial output block comprises the step of determining a first signal representation of an mth initial output block as being a signal representation which occurs $$m \times \frac{0.5 \times S_o}{f} - L$$

signal representations after a first signal representation of the output stream, where L is a predetermined value, and wherein the step of determining the maximum of the similarity measure comprises the steps of:

determining the similarity measure for the $S_o$ signal representations starting at a starting point comprising the first signal representation of the initial output block and the $S_o$ contiguous signal representations of the input stream;

shifting the starting point upward by one signal representation and repeating the step of determining the similarity measure over the fixed search range; and determining a maximum similarity measure.

8. The method of claim 7, wherein the similarity measure is a cross-correlation.

9. A controller for performing time-scale modification of a signal comprised of an input stream of signal representations to form an output stream of signal representations, the controller comprising:

a processing system for directing operation of the controller and for processing the input stream to form the output stream therefrom;

an input interface coupled to the processing system for receiving a message comprising the input stream and intended for a communication receiver; and a transmitter interface coupled to the processing system for controlling a transmitter to send the message as the output stream to the communication receiver, wherein the processing system is programmed to:

make a determination of an output block of $S_o$ signal representations from the output stream for use in overlapping signal representations from the output block with $S_o$ contiguous signal representations of the input stream, the $S_o$ contiguous signal representations beginning with a predetermined signal representation; and perform an overlap of the $S_o$ signal representations of the output block with the $S_o$ contiguous signal representations to form the output stream.

10. The controller of claim 9, wherein $S_o$ is determined by a pitch period and a degree of overlap f.

11. The controller of claim 9, wherein to perform the overlap the processing system is programmed to:

apply a weighting function to the $S_o$ signal representations of the output block and to the $S_o$ contiguous signal representations of the input stream to determine values of $S_o$ signal representations to be substituted for the $S_o$ signal representations of the output block; and place, immediately after the output block, a predetermined number of continuing signal representations from the input stream, the continuing signal representations being subsequent to the $S_o$ contiguous signal representations of the input stream.

12. The controller of claim 9, wherein to make the determination of the output block, the processing system is programmed to:

make a determination of an initial output block of $S_o+W$ signal representations from the output stream, where W is a predetermined search window size;

make a determination of a maximum of a similarity measure between $S_o$ signal representations of the initial output block and the $S_o$ contiguous signal representations of the input stream over a fixed search range of W signal representations, the fixed search range starting at a first signal representation of the initial output block; and determine the output block to comprise $S_o$ signal representations which begin at a signal representation in the initial output block whose $S_o$ signal representations provided the maximum of the similarity measure.

13. The controller of claim 12, wherein to make the determination of the initial output block, the processing system is programmed to determine a first signal representation of an mth initial output block as being a signal representation which occurs $$m \times \frac{0.5 \times S_o}{f} - L$$

signal representations after a first signal representation of the output stream, where L is a predetermined value, and wherein to make the determination of the maximum of the similarity measure, the processing system is programmed to:

determine the similarity measure for the $S_o$ signal representations starting at a starting point comprising the first signal representation of the initial output block and the $S_o$ contiguous signal representations of the input stream;

shift the starting point upward by one signal representation and repeating the step of determining the similarity measure over the fixed search range; and determine a maximum similarity measure.

14. The controller of claim 13, wherein the similarity measure is a cross-correlation.

15. A communication receiver for performing time-scale modification of a signal comprised of an input stream of signal representations to form an output stream of signal representations, the communication receiver comprising:

an antenna for intercepting a radio signal comprising the input stream;

a receiver element coupled to the antenna for demodulating the radio signal to derive the input stream;

a processing system coupled to the receiver element for processing the input stream to form the output stream; and a user interface coupled to the processing system for conveying the output stream to a user, wherein the processing system is programmed to:

make a determination of an output block of $S_o$ signal representations from the output stream for use in overlapping signal representations from the output block with $S_o$ contiguous signal representations of the input stream, the $S_o$ contiguous signal representations beginning with a predetermined signal representation; and perform an overlap of the $S_o$ signal representations of the output block with the $S_o$ contiguous signal representations to form the output stream.

16. The communication receiver of claim 15, wherein $S_o$ is determined by a pitch period and a degree of overlap f.

17. The communication receiver of claim 15, wherein to perform the overlap the processing system is programmed to:

apply a weighting function to the $S_o$ signal representations of the output block and to the $S_o$ contiguous signal representations of the input stream to determine values of $S_o$ signal representations to be substituted for the $S_o$ signal representations of the output block; and place, immediately after the output block, a predetermined number of continuing signal representations from the input stream, the continuing signal representations being subsequent to the $S_o$ contiguous signal representations of the input stream.

18. The communication receiver of claim 15, wherein to make the determination of the output block, the processing system is programmed to:

make a determination of an initial output block of $S_o+W$ signal representations from the output stream, where W is a predetermined search window size;

make a determination of a maximum of a similarity measure between $S_o$ signal representations of the initial output block and the $S_o$ contiguous signal representations of the input stream over a fixed search range of W signal representations, the fixed search range starting at a first signal representation of the initial output block; and determine the output block to comprise $S_o$ signal representations which begin at a signal representation in the initial output block whose $S_o$ signal representations provided the maximum of the similarity measure.

19. The communication receiver of claim 18, wherein to make the determination of the initial output block, the processing system is programmed to determine a first signal representation of an mth initial output block as being a signal representation which occurs $$m \times \frac{0.5 \times S_o}{f} - L$$

signal representations after a first signal representation of the output stream, where L is a predetermined value, and wherein to make the determination of the maximum of the similarity measure, the processing system is programmed to:

determine the similarity measure for the $S_o$ signal representations starting at a starting point comprising the first signal representation of the initial output block and the $S_o$ contiguous signal representations of the input stream;

shift the starting point upward by one signal representation and repeating the step of determining the similarity measure over the fixed search range; and determine a maximum similarity measure.

20. The communication receiver of claim 19, wherein the similarity measure is a cross-correlation.

* * * * *